(12) United States Patent
Nakashima et al.

(10) Patent No.: US 11,078,851 B2
(45) Date of Patent: Aug. 3, 2021

(54) CONTROL DEVICE OF VEHICLE

(71) Applicant: TOYOTA JIDOSHA KABUSHIKI KAISHA, Toyota (JP)

(72) Inventors: Yoichi Nakashima, Toyota (JP); Motoaki Kamimura, Toyota (JP); Atsushi Muto, Toyota (JP); Takafumi Inagaki, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 16/449,563

(22) Filed: Jun. 24, 2019

(65) Prior Publication Data

US 2019/0390617 A1 Dec. 26, 2019

(30) Foreign Application Priority Data

Jun. 22, 2018 (JP) .............................. JP2018-119342

(51) Int. Cl.
*F02D 35/00* (2006.01)
*F02D 41/02* (2006.01)
*F02D 41/06* (2006.01)

(52) U.S. Cl.
CPC ......... *F02D 35/00* (2013.01); *F02D 41/0215* (2013.01); *F02D 41/06* (2013.01); *F02D 2200/101* (2013.01); *F02D 2200/50* (2013.01); *F02D 2200/503* (2013.01); *F02D 2400/12* (2013.01)

(58) Field of Classification Search
CPC ...... F02D 29/02; F02D 35/00; F02D 41/0215; F02D 41/022; F02D 41/06; F02D 2200/10; F02D 2200/101; F02D 2200/50; F02D 2200/503; F02D 2400/12
See application file for complete search history.

(56) References Cited

U.S. PATENT DOCUMENTS 10,309,530 B2 *  6/2019  Yoshioka ............ F16H 61/0267
2015/0232101 A1    8/2015  Sasaki et al.

FOREIGN PATENT DOCUMENTS

| JP | 2014-118947 A | 6/2014 | |
| JP | 2014-202218 A | 10/2014 | |
| WO | WO-2016084588 A1 * | 6/2016 | ............ F16H 61/64 |

* cited by examiner

*Primary Examiner* — Hung Q Nguyen
*Assistant Examiner* — Mark L. Greene
(74) *Attorney, Agent, or Firm* — Oliff PLC

(57) ABSTRACT

A control device of a vehicle includes between an engine and an automatic transmission a fluid transmission device transmitting power from a pump impeller coupled to the engine via a fluid to a turbine impeller coupled to the automatic transmission. The control device determines occurrence of a lost-drive state of the fluid transmission device based on an increase amount of a rotation speed of the engine after a predetermined time during start of the engine.

3 Claims, 5 Drawing Sheets

|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |

○: ENGAGEMENT  BLANK: RELEASE

CONTROL DEVICE OF VEHICLE

The disclosure of Japanese Patent Application No. 2018-119342 filed on Jun. 22, 2018 including the specification, drawings and abstract is incorporated herein by reference in its entirety.

FIELD OF THE INVENTION

The present invention relates to a control device of a vehicle including a fluid transmission device and, more particularly, to a technique for reducing a driver's discomfort feeling at the time of occurrence of a lost-drive state in which a torque transmission efficiency of the fluid transmission device is reduced due to oil shortage or bubble accumulation in oil.

DESCRIPTION OF THE RELATED ART

For example, as in a case where a vehicle is left for a long time with an engine stopped, when an oil runs short in a fluid transmission device disposed between the engine and a transmission, for example, in a torque converter, a lost-drive state occurs in which the torque transmission efficiency of the torque converter is reduced. A known control device of a vehicle makes a determination on the occurrence of the lost-drive state in which the torque transfer performance of the torque converter is reduced due to oil shortage or bubbles accumulation in the torque converter at the engine start, based on an absence of a rise in turbine rotation speed after an elapse of a predetermined time defined depending on an oil temperature from a rise in engine rotation speed, or based on the fact that the turbine rotation speed after an elapse of a predetermined time from a complete explosion state of the engine is lower than a determination value defined depending on the engine rotation speed. For example, this corresponds to a control device of a vehicle including a fluid transmission device described in Patent Documents 1 and 2.

PRIOR ART DOCUMENTS

Patent Documents

Patent Document 1: Japanese Laid-Open Patent Publication. No. 2014-118947
Patent Document 2: Japanese Laid-Open Patent Publication No. 2014-202218

SUMMARY OF THE INVENTION

Technical Problem

However, in the techniques described in Patent Documents 1 and 2, as described above, the lost-drive state is determined based on the absence of the rise in turbine rotation speed after the elapse of the predetermined time defined depending on the oil temperature from the rise in engine rotation speed, or based on the fact that the turbine rotation speed after the elapse of the predetermined time from the complete explosion state of the engine is lower than the determination value defined depending on the engine rotation speed, and therefore, the techniques have a problem of a delay in taking measures such as increasing the engine rotation speed for compensating for insufficient creeping torque or deterioration in starting performance due to the lost-drive state.

The present invention was conceived in view of the situations and it is therefore an object of the present invention to provide a control device of a vehicle including a fluid transmission device, which is configured to promptly determine occurrence of a lost-drive state at engine start.

Solution to Problem

As a result of various studies conducted in view of the situations, the present inventors found that, since an increase in gas volume in a fluid transmission device reduces the moment of inertia as viewed from the input side of the fluid transmission device at the time of occurrence of a lost-drive state, and the occurrence of the lost-drive state in a fluid transmission device at the engine start therefore increases an increase rate of a rotation speed of a pump impeller that is an input side member of the fluid transmission device, the occurrence of the lost-drive state can be determined based on an increased state of a rotation speed of the engine coupled to the pump impeller. The present invention was conceived based on this knowledge.

That is, a first aspect of the present invention provides a control device of a vehicle (a) including between an engine and an automatic transmission a fluid transmission device transmitting power from a pump impeller coupled to the engine via a fluid to a turbine impeller coupled to the automatic transmission, wherein (b) the control device determines occurrence of a lost-drive state of the fluid transmission device based on an increase amount of a rotation speed of the engine after a predetermined time during start of the engine.

A second aspect of the present invention provides the control device of a vehicle recited in the first aspect of the invention, wherein a predefined determination time is used as the predetermined time and, the control device determines the occurrence of the lost-drive state of the fluid transmission device based on whether an increase rate obtained from the increase amount of the rotation speed of the engine at the elapse of the predefined determination time from a rising point of the rotation speed of the engine becomes equal to or greater than a preset determination threshold.

A third aspect of the present invention provides the control device of a vehicle recited in the first or second aspect of the invention, wherein when the occurrence of the lost-drive state is determined, the control device increases an idle rotation speed after the start of the engine as compared to when the occurrence of lost-drive state is not determined.

A fourth aspect of the present invention provides the control device of a vehicle recited in the second aspect of the invention, wherein the determination threshold is corrected with at least one of an output voltage of a battery that is a power source of an electric motor starting the engine, a number of starts of the engine within a predetermined period before the start of the engine, and a temperature of cooling water for the engine.

Advantageous Effects of Invention

According to the control device of a vehicle recited in the first aspect of the invention, whether the lost-drive state of the fluid transmission device is occurred is determined based on the increase amount of the engine rotation speed after a predetermined time during the start of the engine. Since the occurrence of the lost-drive state is determined based on the increase amount of the engine rotation speed rising immediately after the engine start as described above, it is not necessary to wait for the predetermined time until a determination can be made on a rise in the turbine rotation speed after the engine start or a determination can be made on a state of rise in the turbine rotation speed at the time of determination of the lost-drive state as in the conventional manner, and the occurrence of the lost-drive state can promptly be determined. Additionally, the occurrence of the lost-drive state can be determined without depending on the oil temperature.

According to the control device recited in the second aspect of the invention, the predefined determination time is used as the predetermined time and, the control device determines the occurrence of the lost-drive state of the fluid transmission device based on whether the increase rate obtained from the increase amount of the rotation speed of the engine at the elapse of the predefined determination time from the rising point of the rotation speed of the engine becomes equal to or greater than the preset determination threshold. Therefore, both a reduction in time and an improvement in accuracy can be achieved in the determination of the lost-drive state.

According to the control device of a vehicle recited in the third aspect of the invention, when the occurrence of the lost-drive state is determined, the control device increases the idle rotation speed after the start of the engine as compared to when the occurrence of the lost-drive state is not determined. As a result, a deterioration in starting performance of the vehicle is suppressed. Additionally, since the determination of the occurrence of the lost-drive state can be made earlier, an amount of increase in the engine rotation speed in the predetermined time can be suppressed, and a user's discomfort feeling can be reduced.

According to the control device of a vehicle recited in the fourth aspect of the invention, the determination threshold is corrected with at least one of the output voltage of the battery that is the power source of the electric motor starting the engine, the number of starts of the engine within the predetermined period before the start of the engine, and the temperature of the cooling water for the engine. As a result, the determination accuracy of the lost-drive state can be ensured regardless of a reduction in the battery voltage, a deterioration in performance of an electric motor starting the engine, and a change in temperature environment.

MODES FOR CARRYING OUT THE INVENTION

In an example of the present invention, a multi-speed transmission is an automatic transmission in which a plurality of gear positions different in gear ratio is selectively formed. The automatic transmission is, for example, a known planetary gear type automatic transmission, a belt type continuously variable transmission that includes a pair of variable pulleys with a transmission belt wound therearound and that changes winding diameters of the pair of variable pulleys to continuously vary a speed change ratio of the transmission, etc.

The engine is, for example, an internal combustion engine such as a gasoline engine and a diesel engine generating power from combustion of fuel. The vehicle may include at least the engine as a drive power source or may include another prime mover such as an electric motor in addition to the engine.

The fluid transmission device is a device transmitting power from the pump impeller coupled to the engine via the fluid to the turbine impeller coupled to the automatic transmission between the engine and the automatic transmission. The fluid transmission device may be a fluid coupling composed of the two elements, i.e., the pump impeller and the turbine impeller, or a torque converter including a fixed impeller in addition to the two elements.

An example of the present invention will now be described in detail with reference to the drawings.

Example

Figure 1:
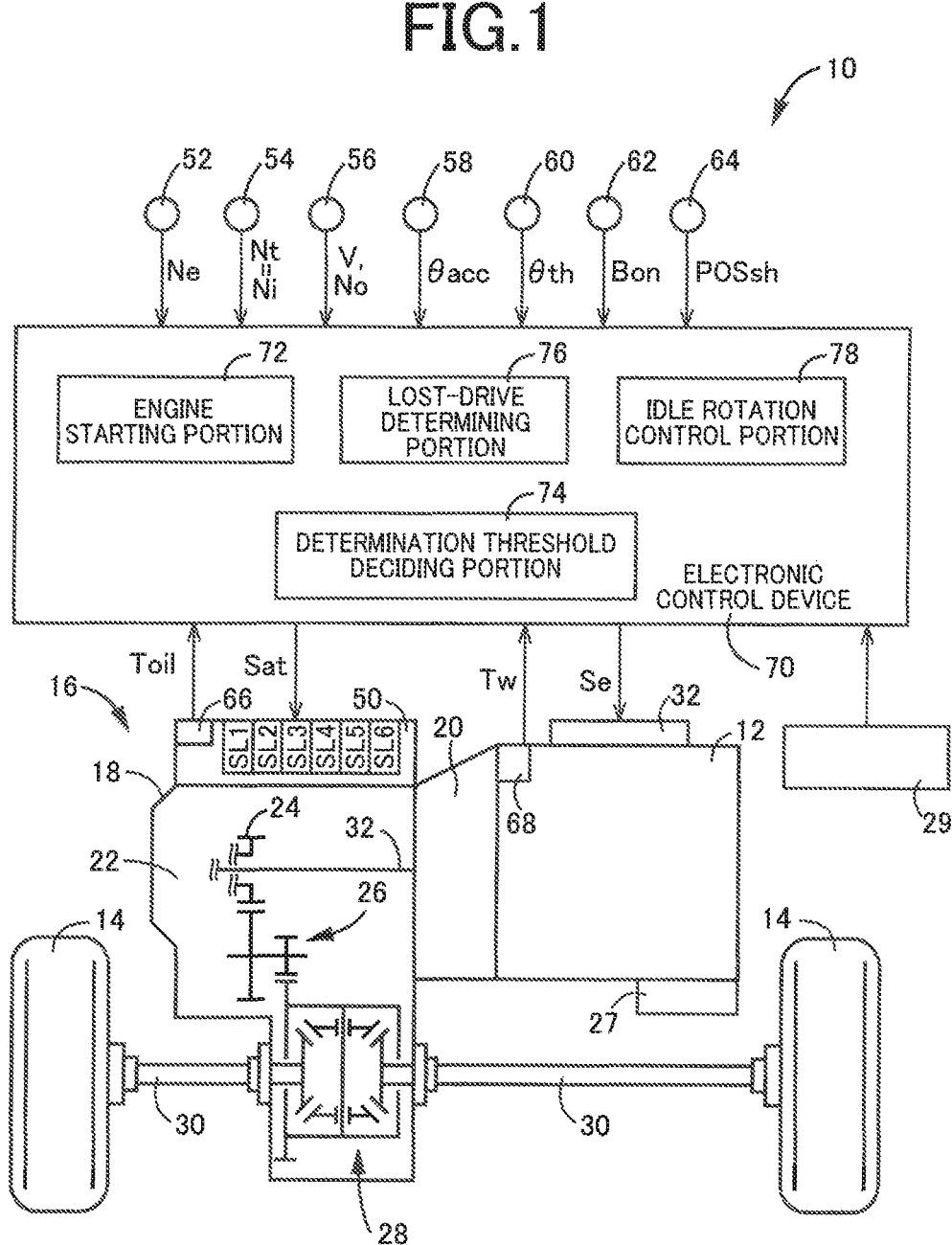
FIG. 1 is a view for explaining a schematic configuration of a vehicle to which the present invention is applied and is a view for explaining main portions of a control system and control functions of an electronic control device of the vehicle.

FIG. 1 is a view for explaining a schematic configuration of a vehicle 10 to which the present invention is applied and is a view for explaining main portions of control functions and a control system of an electronic control device 70 included in the vehicle 10. In FIG. 1, the vehicle 10 includes an engine 12, front wheels 14, and a power transmission device 16 disposed in a power transmission path between the engine 12 and the front wheels 14. The power transmission device 16 includes, in a casing 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear 28 coupled to the reduction gear mechanism 26, etc. Rear wheels are not shown.

The vehicle 10 is disposed with a starter motor 27 rotationally driving the engine 12 for starting the engine 12, and a battery 29 charged by an alternator (not shown) rotationally driven by the engine 12 and functioning as a power source for electrical components of the vehicle 10 including the electronic control device 70 and a drive electric power source for the starter motor 27.

The power transmission device 16 also includes a pair of drive shafts 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the front wheels 14.

The engine 12 is a drive power source of the vehicle 10 and includes an engine control device 32 having various pieces of equipment necessary for output control of the engine 12, such as an electronic throttle device, a fuel injection device, and an ignition device. An output torque of the engine 12 (i.e., engine torque Te) is controlled through the engine control device 32, which is controlled by the electronic control device 70 described later, in accordance with an accelerator opening degree θacc corresponding to a drive request amount for the vehicle 10 from a driver.

Figures 2, 3:
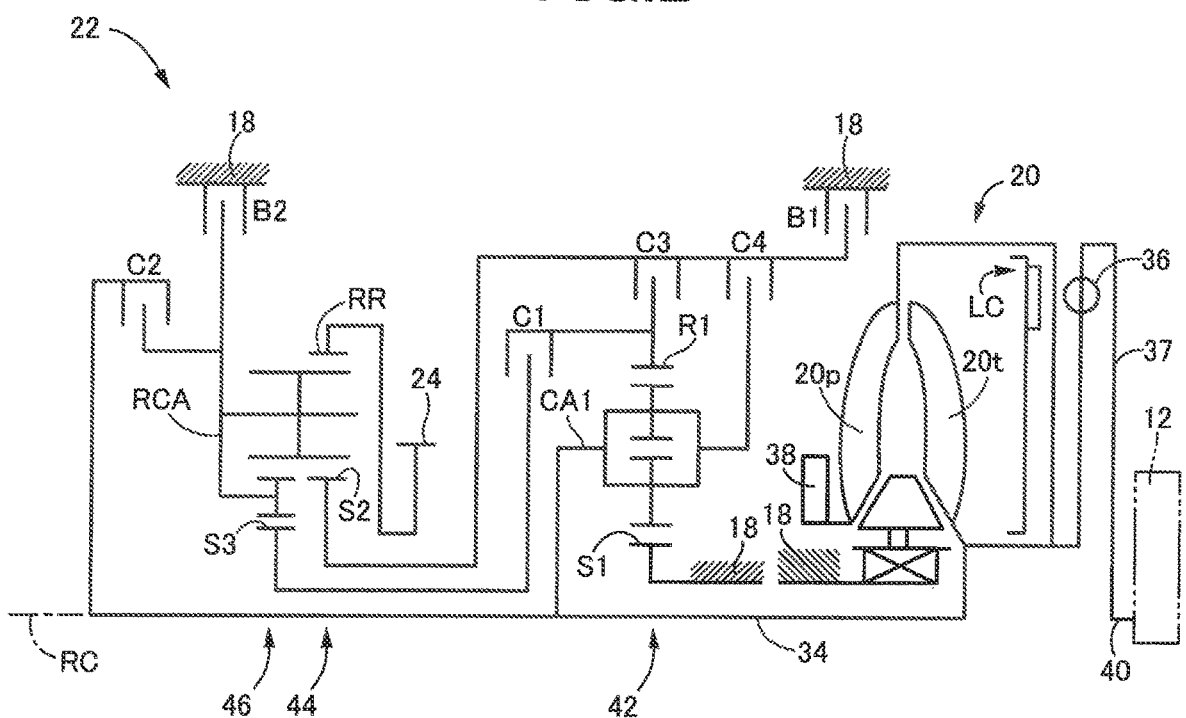
FIG. 2 is a schematic for explaining an example of a torque converter and an automatic transmission included in the vehicle of FIG. 1.
FIG. 3 is an operation chart for explaining a relationship between a shift operation of the automatic transmission of FIG. 2 and a combination of operations of engagement devices used therefor.

FIG. 2 is a schematic for explaining an example of the torque converter 20 and the automatic transmission 22. The torque converter 20, the automatic transmission etc. are configured substantially symmetrically with respect to an axial center RC of a transmission input shaft 34 that is an input rotating member of the automatic transmission 22 and have lower halves from the axial center RC not shown in FIG. 2.

In FIG. 2, the torque converter 20 is disposed in a power transmission path between the engine 12 and the automatic transmission 22 and is a fluid transmission device including a pump impeller 20$p$ and a turbine impeller 20$t$. The pump impeller 20$p$ is an input rotating member of the torque converter 20 and is coupled to a crankshaft 40 of the engine 12 via a damper 36 and a drive plate 37. The turbine impeller 20$t$ is an output rotating member of the torque converter 20 and is coupled to the transmission input shaft 34. The transmission input shaft 34 also serves as a turbine shaft.

The torque converter 20 includes a mechanical oil pump 38 coupled to the pump impeller 20$p$. The torque converter 20 includes a known lockup clutch LC as a direct coupling clutch coupling the pump impeller 20$p$ and the turbine impeller 20$t$. The oil pump 38 is rotationally driven by the engine 12 to supply hydraulic fluid as a source pressure for a hydraulic control circuit 50 (see FIG. 1) providing shift control of the automatic transmission. 22 and a switching control of an operation state of the lockup clutch LC by supplying the hydraulic fluid into the torque converter 20 and switching a flow direction of the hydraulic fluid.

The automatic transmission 22 is a multi-speed transmission constituting a portion of the power transmission path between the engine 12 and the front wheels 14. The automatic transmission 22 is a known planetary gear type automatic transmission. including a plurality of planetary gear devices, i.e., a first planetary gear device 42, a second planetary gear device 44, and a third planetary gear device 46, and a plurality of engagement devices CB, i.e., a first clutch C1, a second clutch C2, a third clutch C3, a fourth clutch C4, a first brake B1, and a second brake 132.

The first clutch C1, the second clutch C2, the third clutch C3, the fourth clutch C4, the first brake B1, and the second brake 132 are hydraulic friction engagement devices made up of multi-plate or single-plate type clutches and brakes pressed by hydraulic actuators, band brakes tightened by hydraulic actuators, etc. The first clutch C1, the second clutch C2, the third clutch C3, the fourth clutch C4, the first brake B1, and the second brake B2 have respective operation states (such as engagement or release) switched when respective torque capacities are changed in accordance with regulated hydraulic pressures (clutch pressures) respectively output from solenoid valves SL1 to SL6 etc. in the hydraulic control circuit 50.

In the automatic transmission 22, rotating elements (a first sun gear S1, a first carrier CA1, a first ring gear R1, a second sun gear S2, a third sun gear S3, a carrier RCA, a ring gear RR) of the plurality of planetary gear devices include those coupled to each other or coupled to the transmission input shaft 34, the casing 18, or the transmission output gear 24, directly or indirectly (or selectively) via the engagement devices CB. The second planetary gear device 44 and the third planetary gear device 46 are of the so-called Ravigneaux type in which the carriers are made up of the common carrier RCA and the ring gears are made up of the common ring gear RR.

In the automatic transmission 22, any two of the first clutch C1, the second clutch C2, the third clutch C3, the fourth clutch C4, the first brake 131, and the second brake B2 are selectively engaged, for example, as shown in an engagement operation table of FIG. 3, to selectively form a plurality of gear positions different in gear ratio (speed change ratio) γ(=AT input rotation speed Ni/AT output rotation speed No), i.e., gear shift positions from a first speed gear position "1st" to an eighth speed gear position "8th". In the engagement operation table of FIG. 3, a "circle" and a blank indicate engagement and release, respectively.

Returning to FIG. 1, the electronic control device 70 included in the vehicle 10 is configured to include the so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and may be configured separately for each of the engine output control, the hydraulic control (the shift control), etc., as needed.

The electronic control device 70 is supplied with various signals based on detection values from, for example, an engine rotation speed sensor 52, an input shaft rotation speed sensor 54, an output shaft rotation speed sensor 56, an accelerator opening degree sensor 58, a throttle valve opening degree sensor 60, a brake switch 62, a shift position sensor 64, an oil temperature sensor 66, and a cooling water temperature sensor 68 of the engine 12 disposed on the vehicle 10, for example, an engine rotation speed Ne that is rotation speed of the engine 12 (i.e., a pump impeller rotation speed Np of the pump impeller 20$p$) (rpm), the rotation speed Ni of the transmission input shaft 34 (i.e., a rotation speed Nt of the turbine impeller 20$t$) (rpm), the rotation speed No (rpm) of the transmission output gear 24 corresponding to vehicle speed V, the accelerator opening degree θacc (%) that is an operation amount of an accelerator pedal, a throttle valve opening degree θth (%) that is an opening degree of a throttle valve included in the electronic throttle device, a brake-on Bon indicating that a brake operation member for actuating a wheel brake is operated by the driver, an operation position POSsh of a shift lever serving as a shift operating member included in the vehicle 10, a hydraulic fluid temperature (° C.) that is a temperature of the hydraulic fluid in the hydraulic control circuit 50, and a cooling water temperature Tw (° C.) that is a temperature of a cooling water of the engine 12

The electronic control device 70 outputs to respective devices (e.g., the engine control device 32, the hydraulic control circuit 50) included in the vehicle 10 various command signals (e.g., an engine control command signal Se, a hydraulic control command signal Sat). This hydraulic control command signal Sat is a command signal (an instruction pressure) for driving each of the solenoid valves SL1 to SL6 and is output to the hydraulic control circuit 50.

The electronic control device 70 functionally includes an engine starting portion 72, a determination threshold deciding portion 74, a lost-drive determining portion 76, and an idle rotation control portion 78 so as to implement main portions of the control of this example. The electronic control device 70 determines the occurrence of a lost-drive state of the torque converter 20 based on an increase amount ΔNe (rpm) of the engine rotation speed Ne after a predetermined time from a rise in the rotation speed Ne (rpm) of the engine 12 during the start of the engine 12 and, if it is determined that the torque converter 20 is in the lost-drive state, the electronic control device 70 makes an idle rotation speed X (rpm), which is the rotation speed Ne of the engine 12 after start of the engine 12, higher than an idle rotation speed Y (rpm) when the torque converter 20 is not in the lost-drive state.

When the engine starting portion 72 receives an engine start command based on a driver's engine start operation, the engine starting portion 72 causes the starter motor 27 to rotationally drive the engine 12 and causes the engine control device 32 to inject fuel into a cylinder of the engine 12 and to ignite the fuel in the cylinder so that the engine 12 can autonomously rotate.

The lost-drive determining portion 76 determines that the torque converter 20 is in the lost-drive state when an increase amount ΔNe (rpm) or an increase rate dNe/dt (mm/sec) at the elapse of a predefined determination time T1 from an engine start initiation point of the engine 12 or a rising point of the engine rotation speed Ne increased in the starting process of the engine 12 is equal to or greater than a respective determination threshold Sg (rpm) or Sh (rpm/sec) decided in advance by the determination threshold deciding portion 74, and determines that the torque converter 20 is in a non-lost-drive state if the increase amount ΔNe or the increase rate dNe/dt is less than the determination threshold. Sg or Sh. The determination thresholds Sg and Sh described above are values empirically obtained in advance so that the occurrence of the lost-drive state can be determined.

The increase rate dNe/dt at the elapse of the determination time T1 from the engine start initiation point or the rising point of the engine rotation speed Ne may be obtained by dividing the increase amount ΔNe of the engine rotation speed Ne at the elapse of the determination time T1 from the engine start initiation point of the rising point of the engine rotation speed Ne by the determination time T1 or may be obtained from a slope of the engine rotation speed Ne obtained by dividing an increase amount of the engine rotation speed Ne between predetermined sampling values of the engine rotation speed Ne by a sampling period (e.g., a predetermined time), for example. The determination time T1 is a time until the engine rotation speed Ne stably increases at the start of the engine 12 and is empirically obtained in advance.

The determination threshold deciding portion 74 decides a fixed basic value Sg1 or Sh1 empirically obtained and stored in advance as the determination threshold Sg or Sh used for determining the lost-drive state in the lost-drive determining portion 76. Preferably, the determination threshold deciding portion 74 can decide as the determination threshold Sg a value (Sg1×H1), (Sg1×H2), or (Sg1×H3), or (Sg1−K11), (Sg1−K21), or (Sg1−K31) obtained by correcting the basic value Sg1 with a correction coefficient H1, H2, or H3 smaller than one or a correction value K11, K21, or K31 obtained, for example, from a relationship stored in advance shown in FIG. 4, 5, or 6, based on an output voltage Vb of the battery 29, the number Ns of starts of the engine 12 within a predetermined period of; for example, about 5 to 10 minutes before the start of the engine 12, or the cooling water temperature Tw of the engine 12.

Figure 4:
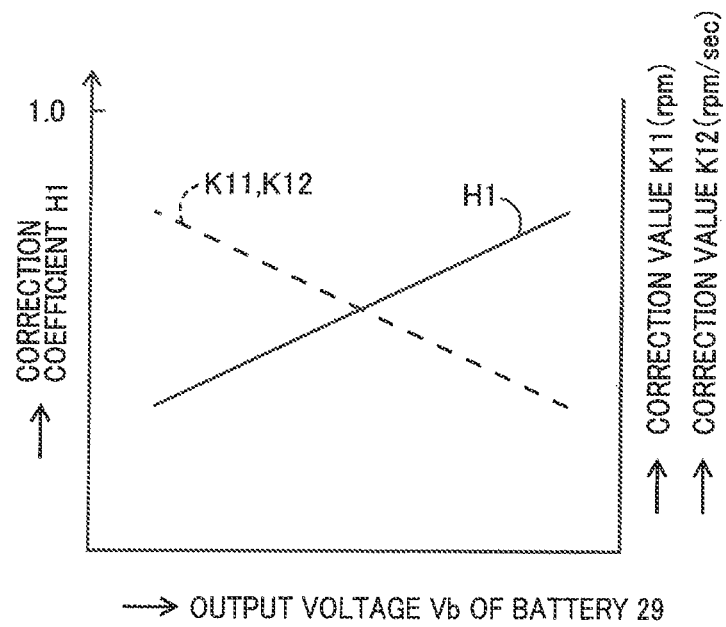
FIG. 4 is a diagram showing a relationship used for correcting and obtaining a determination threshold based on a battery voltage.
Figure 5:
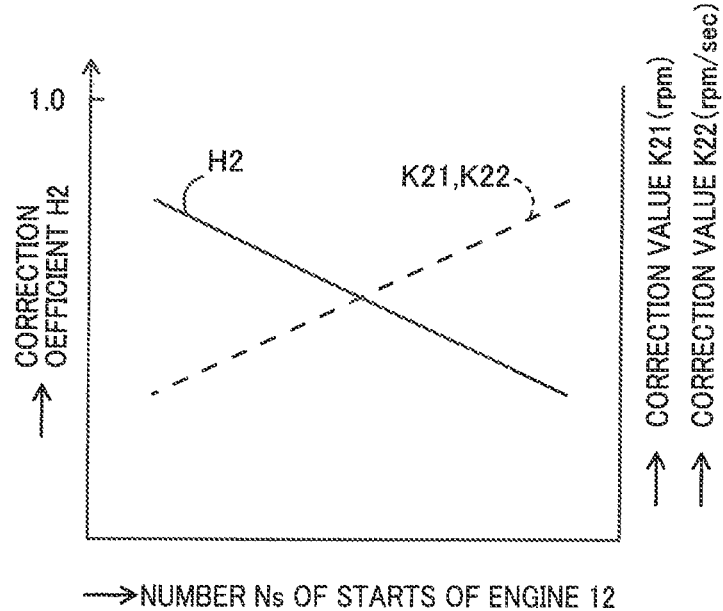
FIG. 5 is a diagram showing a relationship used for correcting and obtaining a determination threshold based on the number of starts of an engine.
Figure 6:
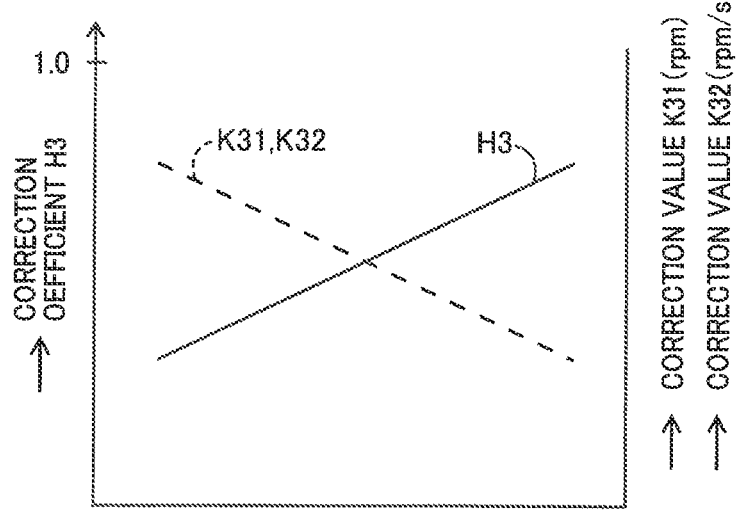
FIG. 6 is a diagram showing a relationship used for correcting and obtaining a determination threshold based on a cooling water temperature of the engine.

Alternatively, the determination threshold deciding portion 74 can decide as the determination threshold Sh a value (Sh1×H1), (Sh1×H2), or (Sh1×H3), or (Sh1−K12), (Sh1−K22), or (Sh1−K32) obtained by correcting the basic value Sh1 with the correction coefficient H1, H2, or H3 smaller than one or a correction value K12, K22, or K32 obtained in the same way from a relationship stored in advance shown in FIG. 4, 5, or 6.

As the output voltage Vb of the battery 29 becomes lower, as the number Ns of starts of the engine 12 within the predetermined period before the start of the engine 12 becomes larger, or as the cooling water temperature Tw of the engine 12 becomes lower, a rise in the rotation speed Ne of the engine 12 becomes gentler at the engine start, and therefore, to avoid erroneous determination and increase determination accuracy of the lost-drive state of the torque converter 20, the respective relationships of FIGS. 4 to 6 are empirically defined such that the correction coefficient H1 becomes smaller as the output voltage Vb of the battery 29 becomes lower in FIG. 4, that the correction coefficient H2 becomes smaller as the number Ns of starts of the engine 12 becomes larger in FIG. 5, and that the correction coefficient H3 becomes smaller as the cooling water temperature Tw of the engine 12 becomes lower in FIG. 6.

If the lost-drive determining portion 76 determines that the torque converter 20 is not in the lost-drive state, the idle rotation control portion 78 commands the engine control device 32 to set the engine rotation speed Ne after the engine start to a normal idle rotation speed Y (rpm) of about 800 rpm, and if the lost-drive determining portion 76 determines that the torque converter 20 is in the lost-drive state, the idle rotation control portion 78 commands the engine control device 32 to set the engine rotation speed Ne after the engine start to an idle rotation speed X (rpm) higher than the normal idle rotation speed Y (rpm).

The lost-drive determining portion 76 can determine that the torque converter 20 is in the lost-drive state if the increase rate dNe/dt at the elapse of the determination time T1 from the engine start initiation point or the rising point of the engine rotation speed Ne increased in the starting process of the engine 12 is equal to or greater than the determination threshold Sh decided in advance by the determination threshold deciding portion 74, because when an oil shortage state in the torque converter 20 reduces a moment of inertia $I_{TC}$ of the torque converter 20, an acceleration a of the torque converter 20 becomes larger and the increase rate of the engine rotation speed Ne becomes larger due to the following relationship represented by Eq. (1):

$$\alpha = (T_{SM} - T_{EF})/(I_E + I_{DP} + I_{TC}) \quad (1)$$

In the above equation (1), $T_{SM}$ is the drive torque of the starter motor 27, $T_{EF}$ is the friction torque of the engine 12, $I_E$ is the moment of inertia of the engine 12, $I_{DP}$ is the moment of inertia of the drive plate 37, and $I_{TC}$ is the moment of inertia of the torque converter 20.

Figure 7:
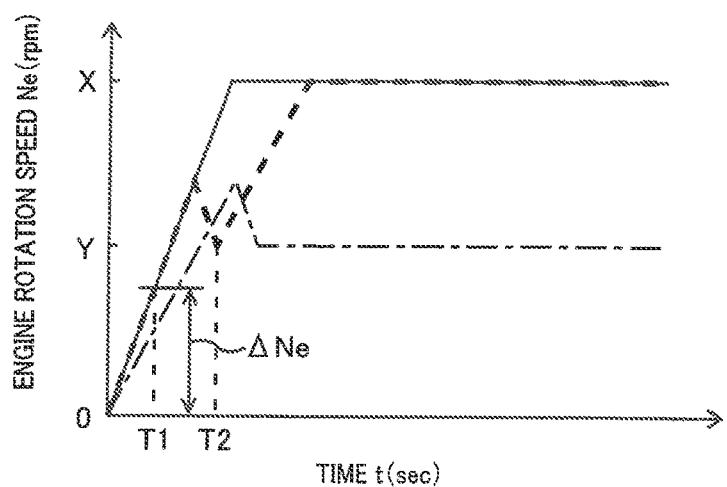
FIG. 7 is a time chart showing main portions of the control operation of the electronic control device shown in FIG. 1.

FIG. 7 is a time chart showing main portions of the control operation of the electronic control device 70, i.e., an operation of determining the lost-drive state during engine start and a subsequent idle rotation control.

In FIG. 7, changes in the engine rotation speed Ne during and after engine start are respectively indicated for both cases where the occurrence of the lost-drive state is determined based on the increase amount ΔNe, or the increase rate dNe/dt of the engine rotation speed Ne, after the determination time T1 from the engine start initiation point and where the occurrence is not determined. A solid line corresponds to a case where the occurrence is detected and the dashed-dotted line corresponds to a case where the occurrence is not detected. In FIG. 7, changes in the engine rotation speed Ne during and after engine start are indicated by a broken line for the conventional case where the occurrence of the lost-drive state is determined based on the turbine rotation speed Nt after a determination time T2 (>T1) from the engine start initiation point. Peaks of the broken line and the dashed-dotted line indicate the completion of start of the engine 12 due to complete explosion, and the determination time T2 is set after this time point. As apparent from FIG. 7, in the case of this example indicated by the solid line, the lost-drive state of the torque converter 20 is promptly determined before the complete explosion of the engine 12, so that a loss of time is small.

Figure 8:
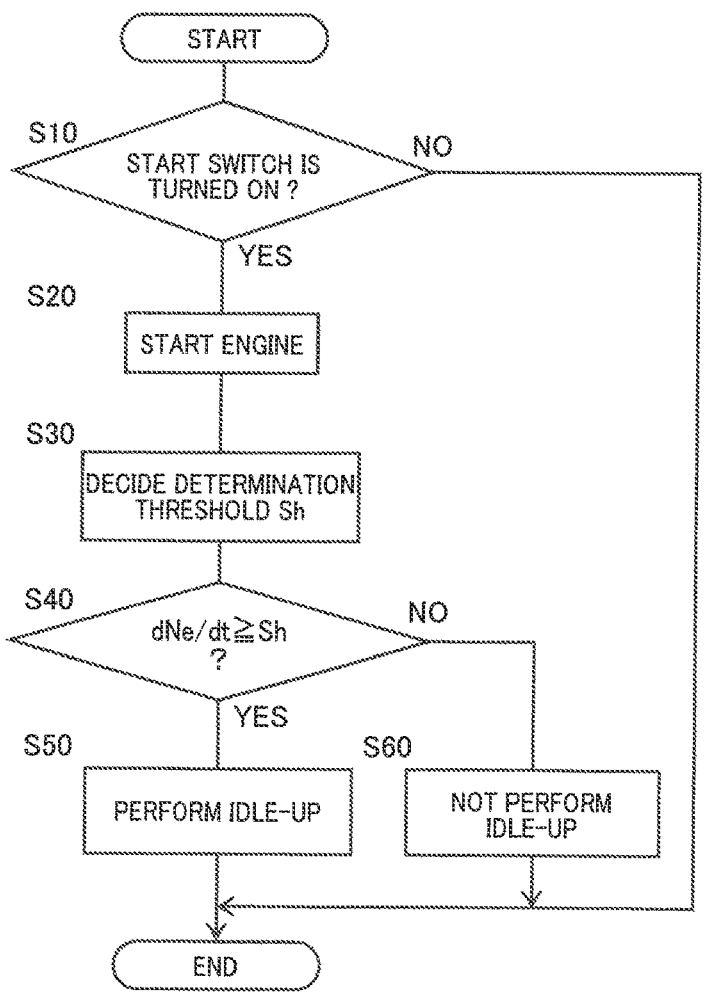
FIG. 8 is a flow chart showing main portions of the control operation of the electronic control device shown in FIG. 1.

FIG. 8 is a flow chart showing main portions of the control operation of the electronic control device 70, i.e., the operation of determining the lost-drive state during engine start and the subsequent idle rotation control. In FIG. 8, first, at step (hereinafter, step is omitted) S10, it is determined whether a start switch of the engine 12 is turned on by the driver. If the determination of S10 is negative, this routine is terminated, and if the determination is affirmative, the starter motor 27 rotationally drives the engine 12, while the engine control device 32 injects feel into the cylinder of the engine 12 and performs ignition in the cylinder at S20 corresponding to the engine starting portion 72.

Subsequently, at S30 corresponding to the determination threshold deciding portion 74, a fixed basic value Sh1 empirically obtained and stored in advance is decided as the determination threshold Sh used for determination of the lost-drive state. Preferably, the value decided as the determination threshold Sh is the value (Sh1×H1), (Sh1×H2), or (Sh1×H3) or (Sh1−K12), (Sh1−K22), or (Sh1−K32) obtained by correcting the basic value Sh1 with the correction coefficient H1, H2, or 113 smaller than one or the correction value K12, K22, or K32 obtained, for example, from the relationship stored in advance shown in FIG. 4, 5, or 6 based on the output voltage Vb of the battery 29, the number Ns of starts of the engine 12 within the predetermined period before the start of the engine 12, or the cooling water temperature of the engine 12.

Subsequently, at S40 corresponding to the lost-drive determining portion 76, it is determined whether the increase rate dNe/dt at the elapse of the predefined determination time T1 from the engine start initiation point or the rising point of the engine rotation speed Ne increased in the starting process of the engine 12 is equal to or greater than the determination threshold Sh determined in advance by the determination threshold deciding portion 74.

If the determination of S40 is negative, i.e., if it is not determined that the lost-drive state has occurred since the increase rate dNe/dt is less than the determination threshold Sh, a command is output to the engine control device 32 to set the engine rotation speed Ne after the engine start to the normal idle rotation speed Y (rpm) of about 800 rpm, i.e., not to perform idle-up, at S60 corresponding to the idle rotation control portion 78.

However, if the determination of S40 is affirmative, i.e., if it is determined that the lost-drive state has occurred since the increase rate dNe/dt is equal to or greater than the determination threshold Sh, a command is output to the engine control device 32 to set the engine rotation speed Ne after the engine start to the idle rotation speed X (rpm) higher than the normal idle rotation speed Y (rpm) described above, i.e., to perform idle-up, at S50 corresponding to the idle rotation control portion 78.

As described above, according to this example, the lost-drive state of the torque converter 20 is determined based on the increase amount ΔNe of the engine rotation speed Ne after a predetermined time during the start of the engine 12. In other words, the lost-drive state of the torque converter 20 is determined based on the slope, i.e., the increase rate dNe/dt, of the rotation speed Ne of the engine 12 during the start of the engine 12. Since the lost-drive state is determined based on a slope of the engine rotation speed Ne rising immediately after the engine start as described above, it is not necessary to wait for the determination time T2 until a determination can be made on a rise in the turbine rotation speed Nt after the engine start or a determination can be made on a state of rise in the turbine rotation speed Nt at the time of determination of the lost-drive state as in the conventional manner, and the occurrence of the lost-drive state can promptly be determined. Additionally, the occurrence of the lost-drive state can be determined without depending on the hydraulic fluid temperature Toil.

According to this example, the predefined determination time T1 is used as the predetermined time and, the electronic control device 70 determines the lost-drive state of the torque converter 20 based on whether the increase rate dNe/dt obtained from the increase amount ΔNe of the rotation speed Ne of the engine 12 at the elapse of the predefined determination time T1 from the rising point of the rotation speed Ne of the engine 12 becomes equal to or greater than the preset determination threshold Sh, and therefore, both a reduction in time and an improvement in accuracy can be achieved in the determination of the lost-drive state.

According to this example, when the lost-drive state is determined, the electronic control device 70 increases an idle rotation speed Nid1 after the start of the engine 12 as compared to when the lost-drive state is not determined. As a result, a deterioration in starting performance of the vehicle 10 is suppressed. Additionally, since the determination of the lost-drive state can be made earlier, an amount ΔNe of increase in the engine rotation speed Ne in the predetermined time can be suppressed, and a user's discomfort feeling can be reduced.

According to this example, the determination threshold Sh is corrected with at least one of the output voltage Vb of the batten 29 that is the power source of the starter motor 27 starting the engine 12, the number Ns of starts of the engine 12 within the predetermined period before the start of the engine 12, and the cooling water temperature Tw of the engine 12. As a result, the erroneous determination on the lost-drive state of the torque converter 20 is prevented, and the determination accuracy of the lost-drive state can be ensured regardless of a reduction in the battery voltage, a deterioration in performance of an electric motor starting the engine, and a change in temperature environment.

Although the example of the present invention has been described in detail with reference to the drawings, the present invention can be also applied in other forms.

In the example described above, the occurrence of the lost-drive state of the torque converter 20 is determined based on whether the increase rate dNe/dt (rpm/sec) obtained from the increase amount ΔNe (rpm) at the elapse of the predefined determination time T1 from the rising point of the rotation speed Ne of the engine 12 becomes equal to or greater than the preset determination threshold. Sh; however, the occurrence of the lost-drive state of the torque converter 20 may be determined based on whether the increase amount ΔNe (rpm) becomes equal to or greater than the preset determination threshold Sg (rpm). In short, whether the lost-drive state has occurred may be determined based on the increase amount ΔNe (rpm).

The determination time T1 in the example described above may be a time from the engine start initiation point to a time point immediately after the engine start as long as the increase rate dNe/dt of the engine rotation speed Ne is stable and may be about ⅓ to 1/10 of the conventional determination time T2, for example.

In the example described above, the power of the engine 12 is transmitted via the torque converter 20 to the automatic transmission 22; however, the present invention in not limited to this form. For example, another fluid transmission device such as a fluid coupling without a torque amplification effect may be used instead of the torque converter 20.

The above description is merely an embodiment and the present invention can be implemented in variously modified and improved forms based on the knowledge of those skilled in the art.

REFERENCE SIGNS LIST

10: vehicle
12: engine
20: torque converter (fluid transmission device)
20p: pump impeller
20t: turbine impeller
22: automatic transmission
70: electronic control device (control device)
Ne: engine rotation speed
ΔNe: increase amount of the engine rotation speed
dNe/dt: increase rate of the engine rotation speed
T1: determination time (predetermined time)
Sh: determination threshold
Sg: determination threshold
Vb: output voltage of a battery
Ns: number of starts of the engine
Tw: cooling water temperature of the engine

What is claimed is:

1. A control device of a vehicle including, between an engine and an automatic transmission, a fluid coupling composed of a pump impeller coupled to the engine and a turbine impeller coupled to the automatic transmission, the fluid coupling transmitting power from the pump impeller via a fluid to the turbine impeller, wherein
the control device is configured to determine occurrence of a lost-drive state of the fluid coupling based on whether an increase rate, obtained from an increase amount of a rotation speed of the engine after a predefined determination time during start of the engine from a rising point of the rotation speed of the engine, becomes equal to or greater than a preset determination threshold.

2. The control device of a vehicle according to claim 1, wherein
when the occurrence of the lost-drive state is determined, the control device increases an idle rotation speed after the start of the engine as compared to when the occurrence of the lost-drive state is not determined.

3. The control device of a vehicle according to claim 1, wherein
the preset determination threshold is corrected with at least one of an output voltage of a battery that is a power source of an electric motor starting the engine, a number of starts of the engine within a predetermined period before the start of the engine, and a temperature of cooling water for the engine.

* * * * *